(12) United States Patent
Eaton

(10) Patent No.: US 10,899,271 B2
(45) Date of Patent: Jan. 26, 2021

(54) SAFETY ALERT SYSTEM FOR POSTAL AND DELIVERY VANS AND TRUCKS

(71) Applicant: Sammy Eaton, Merrillville, IN (US)

(72) Inventor: Sammy Eaton, Merrillville, IN (US)

(*) Notice: Subject to any disclaimer, the term of this patent is extended or adjusted under 35 U.S.C. 154(b) by 0 days.

(21) Appl. No.: 16/531,044

(22) Filed: Aug. 3, 2019

(65) Prior Publication Data
US 2020/0039426 A1 Feb. 6, 2020

Related U.S. Application Data (60) Provisional application No. 62/714,805, filed on Aug. 6, 2018.

(51) Int. Cl.
| | | |
|---|---|---|
| *B60Q 1/26* | (2006.01) | |
| *B60Q 1/46* | (2006.01) | |
| *B60Q 1/30* | (2006.01) | |
| *B60Q 1/50* | (2006.01) | |
| *G06F 3/14* | (2006.01) | |

(52) U.S. Cl.
CPC .............. *B60Q 1/46* (2013.01); *B60Q 1/2611* (2013.01); *B60Q 1/302* (2013.01); *B60Q 1/503* (2013.01); *G06F 3/1407* (2013.01); *B60Q 2400/10* (2013.01); *B60Q 2400/20* (2013.01)

(58) Field of Classification Search
CPC .............. G60Q 1/46; B60Q 1/50; G09F 9/30
USPC ....... 340/468, 467, 463, 479, 472, 473, 902, 340/907; 362/409, 486, 487, 479
See application file for complete search history.

(56) References Cited

U.S. PATENT DOCUMENTS

| | | | |
|---|---|---|---|
| 1,649,630 A | 11/1927 | Ward | |
| 5,010,319 A | 4/1991 | Killinger | |
| 5,560,702 A | 10/1996 | Gold | |
| 5,688,036 A | 11/1997 | Marshall et al. | |
| 6,037,866 A | 3/2000 | Leibowitz | |
| 7,005,982 B1 | 2/2006 | Frank | |
| 7,159,915 B2 | 1/2007 | Corey et al. | |
| 7,621,662 B1 * | 11/2009 | Colbert | B60Q 1/2611 362/479 |
| 7,825,790 B2 | 11/2010 | Tallinger | |
| 8,405,498 B1 * | 3/2013 | Smith | B60R 21/01 340/463 |
| 9,412,287 B2 | 8/2016 | Fisher | |
| 10,412,800 B1 * | 9/2019 | Beattie | H04L 67/12 |

(Continued)

*Primary Examiner* — Tai T Nguyen
(74) *Attorney, Agent, or Firm* — Ritchison Law Offices, PC; John D Ritchison

(57) ABSTRACT

This is a safety alert system for delivery vans, trucks, and carriers for the postal service and delivery industry. It includes warning light devices to regulate traffic with electrically controlled luminous elements as a supplemental light display. It aims to provide the postal vehicle a manner disposed to safely transport and deliver mail. High illumination lights, safety strips and text or visual messaging boards are located on the rear of the postal vans. Strobe action of the lights is an alternative. The device includes (a) a pair of Light Emitting Diode (LED) high illumination light blocks with optional strobe functions; (b) an elongated Light Emitting Diode (LED) high illumination light bar; (c) a high illumination reflective safety tape; and (d) display module having a display (Video and Audio); (e) an audio systems and amplifiers; and (f) remote Controllers for the screen display and video alerts.

13 Claims, 7 Drawing Sheets

(56) References Cited

U.S. PATENT DOCUMENTS

| | | | |
|---|---|---|---|
| 2005/0075770 A1* | 4/2005 | Taylor | G08G 1/161 |
| | | | 701/36 |
| 2007/0040664 A1* | 2/2007 | Johnson | B60Q 1/444 |
| | | | 340/467 |
| 2007/0197084 A1* | 8/2007 | Darolfi | B60Q 1/2692 |
| | | | 439/470 |

* cited by examiner

Fig. 3   REAR VIEW USPS "LLV"
1 ¼ TON DELIVERY - Vehicle

SAFETY ALERT SYSTEM FOR POSTAL AND DELIVERY VANS AND TRUCKS

CROSS-REFERENCE TO RELATED APPLICATIONS:

This application claims the benefit of United States Provisional Patent Application with Ser. No. 62/714,805 filed Aug. 6, 2018, by Sammy Eaton. The application is entitled "Safety alert system for postal and delivery vans and trucks".

FIELD OF INVENTION:

This invention relates to a Safety alert system for postal and delivery vans and trucks. Particularly it relates to a warning light device having a directional warning panel, used to regulate traffic and one in which symbols can be displayed on a warning or information panel with controllable electrical luminous elements. Further this relates to a van tail or rear light display that can contribute to a safer use of the van, and more particularly to the embodiment of an additional or supplementing light display.

It is a traffic advisor including a display capable of shifting between a stowed position and a deployed position. The devices incorporate emergency signal lighting and visual messaging capabilities to all types of vehicles. It aims to provide an ergonomically designed motor vehicle disposed to safely transport and deliver mail while increasing the safety of the human operator and minimizing work-related injuries thereto for postal and delivery vans.

FEDERALLY SPONSORED RESEARCH

None.

SEQUENCE LISTING OR PROGRAM

None.

BACKGROUND-FIELD OF INVENTION AND PRIOR ART

As far as known, there are no Safety alert system for postal and delivery vans and trucks or the like. It is believed that this product is unique in its design and technologies.

BACKGROUND

The need for a Safety alert system for postal and delivery vans and trucks and a Safety Display Light Bar is grounded in today's vehicle environment. Today's Delivery Vehicle Drivers are faced with an ever increasing "Dangerous and Hostile" driving public on the nation's roads. Defensive driving, and following the traffic laws are very important to promote safety and also incorporating other safety precautions can aid in the safety of delivery drivers. Using a device such as the Safety alert system for postal and delivery vans and trucks and its incorporated Safety Display Light Bar could prove to be a great safety benefit for all delivery vehicles, while performing their jobs.

A great example can be illustrated by using a police light bar and siren, an ambulance light bar and sirens or even an ice cream truck's light beacon and speakers, these devices paired with sirens, music etc., promotes audio and visual awareness of these vehicle presence. More importantly, these safety display bars are an important tool for public service workers and emergency vehicle operators. Although there are many options when selecting a Light Bar, the one being used here is a new safety system, not currently being used on delivery vehicles. It allows for a more "Powerful Optic" to provide a visually increased distance and higher level of illumination from LED lights, incorporated in the display bar. This can be seen by the driving public, for safety. Also to include optional, 4-6 more independent units of (Amber LED Light) units placed on the top right and left rear sides of the delivery vehicle, as well as the left and right sides of the vehicle, located upper rear potion of each side. Again, the goal here is to promote safety and awareness to the driving public, "By Being Visibly Loud" on the road! Utilizing this customized safety bar will prove to help curtail many avoidable accidents, and halt many Near Misses. This in itself, would curtail injury, loss of life, missed work, vehicle insurance headaches, and personally for a driver, some peace of mind while they are on the road working.

Vehicle safety is not only urgent, but Paramount! On a daily basis, delivery drivers are faced with an ever increasing, aggressively dangerous driving public! Vehicle safety has become a HUGE concern of mine while performing my letter carrier and parcel delivery duties. Constantly: (a postal driver is being faced with) vehicle operators who display an unsafe and total disregard for the safety and welfare of "working delivery vehicles"! This driving behavior creates and promotes unsafe driving practices on the road. As a result, the unsafe driving environment have created near miss situations, a high rate of driver rage and anger on the road, and for a postal driver, an increased level of driver anxiety. Although the driver employs defensive driving techniques, vehicle operators still disregard the "Rules of the Road", to include posted and mechanical (traffic devices and just plainly, limited courtesy on the roads today! Truly, its mind boggling to observe the unsafe urgency of vehicle operators who go around "working delivery vehicles" at whatever costs!

Even a skilled driver, a driver as a D. S. I "Driver Safety Instructor" for the United States Postal Service or as a Modification NCO, for the U.S. Marine Corp., one can become very motivated to bring attention to this driver safety issue and design a safety device modified to attach to delivery vehicles to promote high visibility of the vehicle, display to vehicle operators, behind the delivery vehicle important safety text highly visible to be read, inside a text display bar.

Problem Solved

The problem solved is safety for postal and deliver vans. The invention is a system of high illumination lights, safety strips and text or visual messaging boards on the rear of the postal vans. This alleviates dangerous situations where the van or truck is stopped and the carrier is entering and exiting the vehicle to deliver or pick-up packages and mail. High visibility is achieved with high illumination Light Emitting Diode (LDE) strips in amber, green or various other colors. Strobe action of the lights is an alternative.

Problems to be Solved:
  A. Upgrade Engineering: caution display lights.
  B. Not enough visibility: caution lights.
  C. Nights, even less visible: Caution lights barely visible.
  D. Distance skewed: Can't see caution lights i.e., sunlight, road conditions, etc.
  E. Display bar: Integrated with flashing caution, text display, amber alerts, safety information.
  F. Additional caution: light display and highly visible reflective tape along the side rear body box.

Finally, for the Safety alert system for postal and delivery vans and trucks and the incorporated Safety Display Light Bar, the Goal is to establish pre-set programs for computer memory, for various alert messages. This safety bar uses intense lighting and messaging to alert vehicles to be cautious and drive safely.

Prior Art

A novelty search revealed the following prior art in the field of the invention:
- A. U.S. Pat. No. 9,412,287 was issued to Fisher in 2016 for a traffic advisor for emergency vehicles. It shows a traffic advisor for an emergency vehicle. The traffic advisor includes a base capable of being attached to a roof of an emergency vehicle. The traffic advisor additionally includes a display member coupled to the base and shiftable relative to the base between a stowed position and a deployed position. The display member is further configured to display one or more advisory messages. The traffic advisor may also include an actuation system for shifting the display member between the stowed position and the deployed position. As such, in the deployed position, the traffic advisor is operable to display advisory messages that are clearly viewable from a position rearward of the emergency vehicle.
- B. U.S. Pat. No. 7,825,790 was issued to Tallinger in 2010 for an emergency vehicle light bar with message display. Taught here is a lighting subsystem and a light bar structure upon which the lighting subsystem is mounted. The lighting subsystem has a display that incorporates both warning signal lights and a programmable message display and is configured to enable the positioning of the lighting subsystem in multiple positions, including a low-profile position and a higher profile position. In one embodiment, the lighting subsystem utilizes an LED matrix display which includes interleaved message-display LEDs and warning-signal LEDs. The system may be positioned at an aerodynamic pursuit angle, and the LEDs may be oriented to maximize forward intensity of the emitted light in the pursuit position. In the low-profile position, the lighting subsystem may be retracted into a recessed compartment in the roof of an emergency vehicle. The message display may be configured to display preprogrammed messages or user-programmed messages, and may be operable by a user outside the vehicle using a remote control.
- C. U.S. Pat. No. 7,159,915 was issued to Corey, et al. in 1997 for an ergonomically designed mail transport and delivery vehicle. A motor vehicle for transporting and delivering mail having vehicle controls (steering, brakes and throttle) that interface with the operator be able to be adjustably located in a position that is comfortable to the operator. The operator seat is of a size and shape that it is comfortable to the 5th percentile female through the 95th percentile male. The operator seat is also adjustable and the brake and throttle are adjustable with respect to the operator seat. Moreover, the seat is pivotable from a driving configuration facing ahead of the vehicle to a laterally facing position where mail operations can be comfortably conducted from the driver's seat. In addition, the door into the cargo compartment includes a window that lines up with a window in the left side of the cargo compartment such that visibility to the left of the vehicle is enhanced.
- D. U.S. Pat. No. 7,005,982 was issued to Frank in 2006 for a Carrier security system. Shown and demonstrated here is a process that deploys detection devices in the carrier vehicles, collection facilities and collection boxes to determine if hazardous materials have deposited. The system is designed to provide detection, identification and measurement of chemical, biological and DNA/RNA elements. When a hazardous material is detected, an alarm notifies the worker. The system communicates with a central monitoring station that receives vehicle ID, GPS positioning and identification of the hazardous material. A HAZMAT team is then dispatched to the vehicle site. Systems that can benefit include carrier vehicles, collection boxes, collection facilities, mail carriers, cargo carriers, freight carriers, package delivery services, express delivery services, etc. The carrier vehicles may include trucks, automobiles, aircraft and ships. The collection boxes may include, containers, mail collection boxes, express delivery collection boxes, etc. The collection facilities may include mail and package receiving centers, express mail and package receiving stations, and shipping and receiving stations.
- E. U.S. Pat. No. 6,037,866 was issued to Leibowitz in 2000 for a hazard device for a vehicle. Portrayed by this invention relates is a hazard device for a vehicle in which an outwardly rotatable vertical panel attaches to the rear of the vehicle. The vertical panel can extend the entire height of the vehicle. A safety panel attaches to the vertical panel and extends to the ground. The vertical panel and safety panel provide protection to a person inspecting the vehicle. Alternatively, a portable hazard device is provided in which a plurality of foldable panel sections are connected. In the extended position, the portable hazard device has a height substantially the same as the vehicle. In the folded position, the portable hazard device can be transported in a vehicle.
- F. U.S. Pat. No. 5,688,036 was issued to Marshall, et al. in 1997 for a high-mounted truck tail lights. This provides a high-mounted truck tail lights for signalling braking and turning of a truck to drivers located beyond other vehicles positioned immediately behind the truck. The device includes a left signal light and a right signal light mounted to the lateral pillars or rear doors of a truck trailer body. The signal lights are positioned proximal to an upper transverse pillar of the truck trailer body so as to be viewable over a car or other vehicle positioned immediately behind the trailer body to reduce accidents resulting from non-visible highway signals during lane changing procedures or the like.
- G. U.S. Pat. No. 5,560,702 was issued to Gold in 1996 for a van rear light display. This development portrays a popular dome-shaped industrial van having rear left and right doors, an added pair of tail lights at the top of the van rear edge to which the doors are hinged. Which in the location noted the tail lights are visible to an oncoming motorist when the doors are open through the clearance bounded by the outwardly diverging van rear edges and upper door edges, thus contributing to safer use during loading and unloading of the industrial van.
- H. U.S. Pat. No. 5,010,319 was issued to Killinger in 1991 for a warning light device. This demonstrates a warning light device having a directional warning panel to regulate traffic, which is attached in a vertical position near the rear of a vehicle. The warning light device displays traffic symbols for following traffic, with controllable electric luminous elements. An autonomous, mobile warning light device with great versatility of display is provided since the warning panel includes a controllable optical fiber display matrix having a plurality of traffic symbols. The warning light device is attached or attachable to the roof, extending as far as the rear, of a motor vehicle. Power is supplied to the warning light device with an electric power supply system of the motor vehicle or a supplementary electric power pack mounted in the motor vehicle. An operating panel is disposed near the dashboard of the motor vehicle, or is built into the dashboard, and has operating elements for switching the warning light device on and off. The operating panel also initiates the displays of various traffic symbols on the optical fiber display matrix. The operating panel, the power supply and the fiber optic display matrix are interconnected with connecting cables installed within the motor vehicle.

I. U.S. Pat. No. 1,649,630 was issued to Ward in 1927 for a delivery truck. This taught a delivery truck where making deliveries of milk and other products where a large number of deliveries are made in a restricted area to customers located relatively close together. Here it is highly desirable that the operator should be able to start and stop the truck quickly and easily in going from one customer to the next. In making deliveries of this kind, a drop body construction has been extensively employed in which the floor of the body of the truck at the longitudinal central part thereof is offset below the floor at the forward" and rear portions of the body and the side door openings are located in registry with the drop or recess thus formed in the bottom of the body. This enables the operator to step into and dismount from the body easily and the vehicle controlling devices may be reached while the operator is standing in the central part of the body.

SUMMARY OF THE INVENTION

This invention is a Safety alert system for postal and delivery vans and trucks. Taught here are the ways a postal or delivery van can be placed into a safer environment by adding the safety system presented herein. In addition, high visibility reflective tape and high illumination, Baha style LED bright lights along the bar and running along the side the rear of the delivery vehicle. The goal here is to display an urgency of safety to vehicle operators when approaching the vehicle and receive driver safety pointers or awareness displayed in the safety bar. The OBJECTIVE IS TO EVOKE Safety consciousness and awareness to the "Driving Public"

The preferred embodiment of the Safety alert system for postal and delivery vans and trucks is comprised of: (a) a pair of Light Emitting Diode (LED) high illumination light blocks with optional strobe functions; (b) an elongated Light Emitting Diode (LED) high illumination light bar (approximately 18 to 36 bulbs); (c) a high illumination reflective safety tape; and (d) display module having a display (Video and Audio); an audio systems and amplifiers; a remote Controller including phone apps, near field cable systems, and wired systems; a remote (In-Cab of the van, phone, etc.); an electrical connection for van, truck, vehicle, or the like such as a wiring/ circuit/ blue tooth signal connection, a means to interconnect the power source and control to the display; a set of main controls (CPU, Circuitry with Inputs— with a keyboard, phone and apps, etc.); a means and connections—controls (hard wired or wireless) and power (wiring} to the display wherein the system has Light emitting Diodes (LEDs) signage with text alerts [optional high illumination amber colors or others such as green, bright yellow, orange, various blues . . . all with optional conventional flashing and/or strobe alternatives] or alternatively a computer screen/TV display or a split screen display with video alerts/visual displays and a means to connect the display to the vehicle such as a fixed bar mounts, a manual flip up, or a motorized flip up all incorporated with existing alert lighting and stop lights.

Objects and Advantages

There are several objects and advantages of the Safety alert system for postal and delivery vans and trucks. There are currently no known safety alert systems or the like that are effective at providing the objects of this invention. A Safety alert system for postal and delivery vans and trucks has various advantages and benefits:

| Item | Advantages |
|---|---|
| 1 | Achieves high visibility |
| 2 | Provides text or visual messaging boards on the rear of the postal vans |
| 3 | Is fast to install on new vehicles or retro-fit existing vehicles |
| 4 | Incorporates component parts already produced |
| 5 | Is a universal designs for attachments to fit different vans, delivery trucks and vehicles |

Finally, other advantages and additional features of the present Safety alert system for postal and delivery vans and trucks will be more apparent from the accompanying drawings and from the full description of the device. For one skilled in the art of safety systems for trucks and vans or other vehicles, it is readily understood that the features shown in the examples with this product are readily adapted to other types of safety systems for vehicles.

DESCRIPTION OF THE DRAWINGS—FIGURES

The accompanying drawings, which are incorporated in and constitute a part of this specification, illustrate an embodiment of the Safety alert system for postal and delivery vans and trucks that is preferred. The drawings together with the summary description given above and a detailed description given below serve to explain the principles of the Safety alert system for postal and delivery vans and trucks. It is understood, however, that the Safety alert system is not limited to only the precise arrangements and instrumentalities shown.

DESCRIPTION OF THE DRAWINGS—REFERENCE NUMERALS

The following list refers to the drawings:

TABLE B

Reference numbers -

| Ref # | Description |
|---|---|
| 30 | Safety alert system 30 for postal and delivery vans and trucks |
| 32 | Original concept sketch 32 of the safety alert system 30 |
| 33 | Prototype sketches 33 of the safety alert system 30 |
| 34 | Design sketch 34 of the safety alert system 30 |
| 38 | Stop/brake light 38 |
| 39 | Existing 39 alert lighting |
| 40 | LED high illumination light blocks 40 with optional strobe function |
| 41 | LED high illumination light bar 41 |
| 45 | High illumination reflective safety tape 45 |
| 53 | Electrical Connection 53 for van, or the like |
| 54 | Wiring/Circuit/Connection 54 to van Connections |
| 54A | a means 54A to interconnect the power 55 |
| 55 | Power Source 55—connection to the van or truck power receptacle 53, a vehicle battery, an auxiliary or supplemental battery, a vehicle or supplemental generator/alternator or a power cord and transformer to an alternating current source (residential or commercial) |
| 56 | a means 56 to control the display 59 |
| 56A | a means 56A to Control the Power Source—wiring and connections |
| 57 | Main Controls 57 (CPU, Circuitry with Inputs—(Keyboard, Phone, Etc.) |
| 58 | Means and connections 58—Controls (Wire or wireless) and Power (Wire} to Display |
| 59 | Display 59(Video and Audio) |
| 59A | Audio systems 59A and amplifiers |
| 60 | Remote Controller 60 including phone apps, near field systems and wired systems |
| 61 | Remote 60 to Main Controller 57 Connection (Infrared, wireless, Wire) |
| 62 | Remote for Display (In-Cab, Phone, Etc.) |
| 63 | Connect on Remote Display 62 to Main Controller 57 |
| 64 | a means 64 to interconnect the power 55 and the means to control 56 the display 59; |
| 66 | Full control and power system 66 block diagram to multi-purpose in cab van or truck system |
| 68 | Simplified control and power system 68 block diagram to multi-purpose in cab van or truck system |
| 70 | Typical LLV US Postal Van 70 |
| 72 | Delivery van 72 |
| 74 | UPS delivery van 74 |
| 75 | Fed Ex Delivery Van 75 |
| 76 | Cable van 76 |
| 77 | Ice cream/food vendor van 77 |
| 78 | Typical service van 78 |
| 79 | Sanitation/refuse/garbage truck 79 |
| 80 | Typical signage 80 |
| 89 | Light emitting Diodes (LEDs) signage 89 with text alerts 90 [optional high illumination amber colors or others such as green, bright yellow, orange, various blues . . . all with optional conventional flashing and/or strobe alternatives] |
| 90 | Text alerts 90 |
| 91 | Computer screen/TV display 91 |
| 92 | Split screen display 92 |
| 93 | Video alerts/visual displays 93 |
| 100 | Fixed bar mounts 100 for display 89, 91, 92 for light bars 41 |
| 105 | Flip up, manual display fixture 105 |
| 107 | Flip up, motorized display fixture 107 |
| 109 | Motor and structure 109 for motorized display 107 |
| 110 | Prior art 110 U.S. Pat. No. 6,037,866 |

TABLE B-continued

Reference numbers -

| Ref # | Description |
|---|---|
| 111 | Prior art 111 U.S. Pat. No. 5,560,702 |
| 112 | Prior art 112 U.S. Pat. No. 5,010,319 |
| 113 | Prior art 113 U.S. Pat. No. 7,825,790 |
| 114 | Prior art 114 U.S. Pat. No. 9,412,287 |

DETAILED DESCRIPTION OF PERFERRED EMBODIMENT

This invention relates to a Safety alert system for postal and delivery vans and trucks. Particularly it relates to a warning light device having a directional warning panel, used to regulate traffic and one in which symbols can be displayed on a warning or information panel with controllable electrical luminous elements. Further this relates to a van tail or rear light display that can contribute to a safer use of the van, and more particularly to the embodiment of an additional or supplementing light display. It is a traffic advisor including a display capable of shifting between a stowed position and a deployed position. The devices incorporate emergency signal lighting and visual messaging capabilities to all types of vehicles. It aims to provide an ergonomically designed motor vehicle disposed to safely transport and deliver mail while increasing the safety of the human operator and minimizing work-related injuries thereto for postal and delivery vans.

The advantages for the Safety alert system 30 for postal and delivery vans and trucks are listed above in the introduction. Succinctly the benefits are that the device:

A. Achieves high visibility

B. Provides text or visual messaging boards on the rear of the postal vans

C. Is fast to install on new vehicles or retro-fit existing vehicles

D. Incorporates component parts already produced

E. Is a universal designs for attachments to fit different vans, delivery trucks and vehicles The preferred embodiment of the Safety alert system 30 for postal and delivery vans and trucks is comprised of: (a) a pair of Light Emitting Diode (LED) high illumination light blocks 40 with optional strobe functions; (b) an elongated Light Emitting Diode (LED) high illumination light bar 41 (approximately 18 to 36 bulbs); (c) a high illumination reflective safety tape 45; and (d) display module having a display 59, 89, 91, 92 (Video and Audio); an audio systems 59A and amplifiers; a remote Controller 60 including phone apps, near field cable systems, and wired systems; a remote (In-Cab of the van, phone, etc.); an electrical connection 53 for van, truck, vehicle, or the like such as a wiring/circuit/blue tooth signal connection 54, a means 54A to interconnect the power source 55 and a means 56 to control the display 59, 89, 91, 92; a means 56A to Control the Power Source—wiring and connections; a set of main controls 57 (CPU, Circuitry with Inputs—with a keyboard, phone and apps, etc.); a means and connections 58—controls (hard wired or wireless) and power (wiring} to the display wherein the system has Light emitting Diodes (LEDs) signage 89 with text alerts 90 [optional high illumination amber colors or others such as green, bright yellow, orange, various blues . . . all with optional conventional flashing and/or strobe alternatives] or alternatively a computer screen/TV display 91 or a split screen display 92 with video alerts/ visual displays 93 and a means to connect the display 89, 91, 92 to the vehicle such as a fixed bar mounts 100, a manual flip up, or a motorized flip up all incorporated with existing 39 alert lighting and stop lights 38.

There is shown in FIGS. 1-7 a complete description and operative embodiment of the Safety alert system 30 for postal and delivery vans and trucks. In the drawings and illustrations, one notes well that the FIGS. 1-7 demonstrate the general configuration and use of this product. The various example uses are in the operation and use section, below.

The accompanying drawings, which are incorporated in and constitute a part of this specification, illustrate an embodiment of the Safety alert system 30 for postal and delivery vans and trucks that is preferred. The drawings together with the summary description given above and a detailed description given below serve to explain the principles of the Safety alert system 30. It is understood, however, that the Safety alert system 30 for postal and delivery vans and trucks is not limited to only the precise arrangements and instrumentalities shown. Other examples of safety alert systems and uses are still understood by one skilled in the art of safety systems for vehicles and the like to be within the scope and spirit shown here.

Figure 1A:
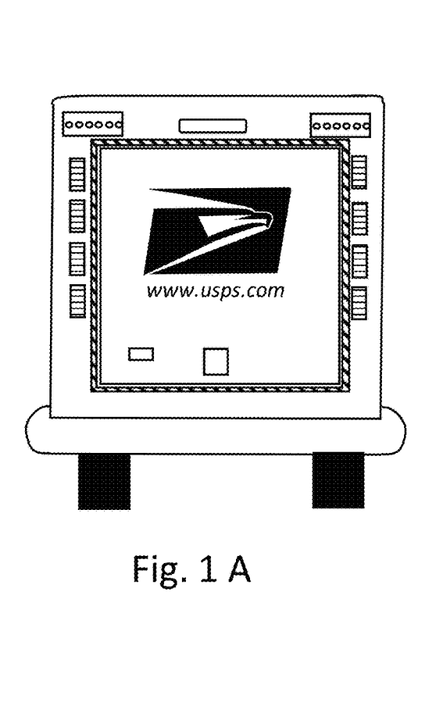
FIGS. 1A through 1C are sketches of the general safety alert system for the post office and delivery van and trucks.
Figure 1B:
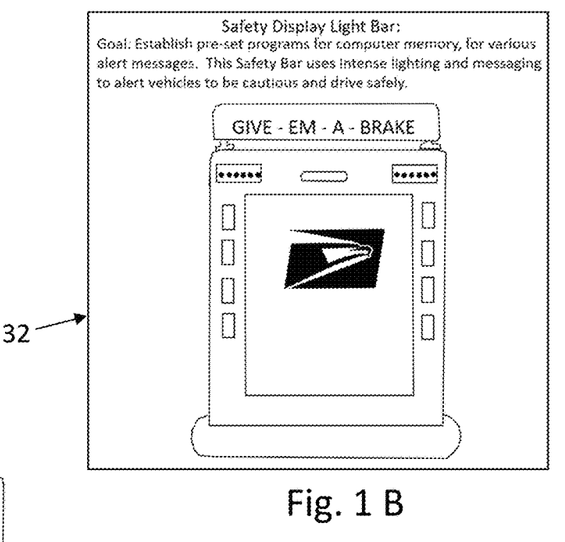
Figure 1C:
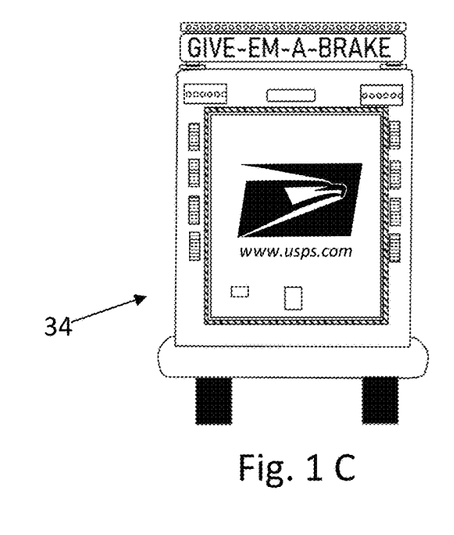

FIGS. 1A through 1C are sketches of the general safety alert system for the post office and delivery van and trucks. The sketches here show: a Safety alert system 30 for postal and delivery vans and trucks; an Original concept sketch 32 of the safety alert system 30; and a Design sketch 34 of the safety alert system 30.

Figure 2:
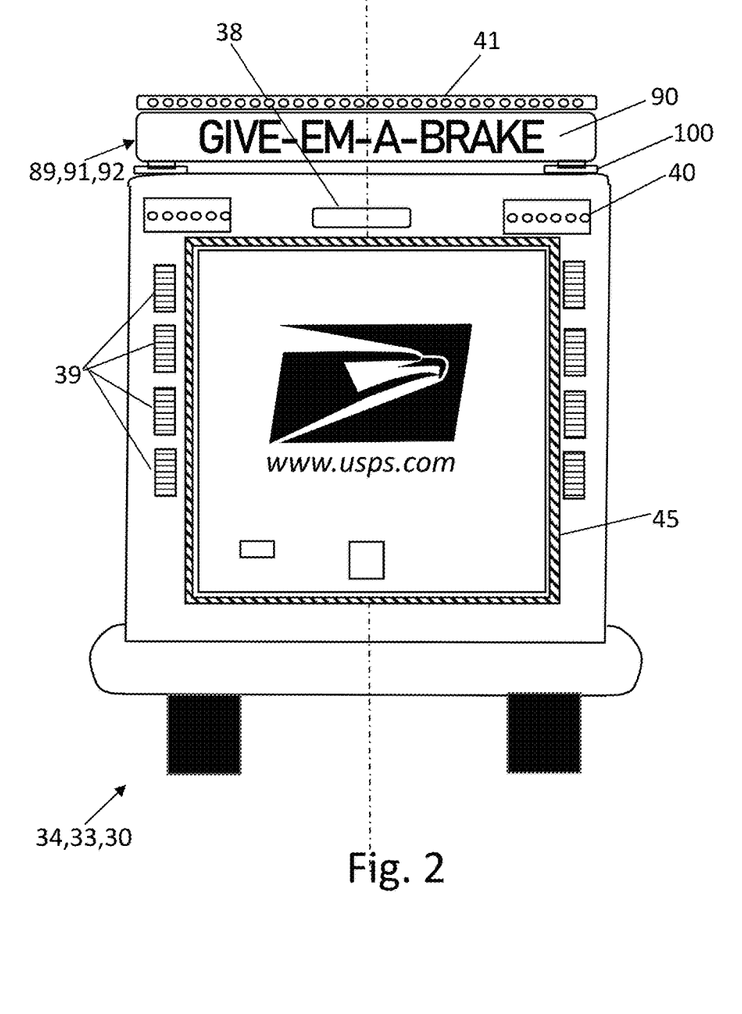
FIG. 2 is a sketch of the safety alert system with components and features noted.

FIG. 2 is another sketch of the safety alert system 30 with the components and features noted. Portrayed here are a Safety alert system 30 for postal and delivery vans and trucks; a Design sketch 34 of the safety alert system 30; a stop/brake light 38; an existing 39 alert lighting; a Light Emitting Diode (LED) high illumination light blocks 40 with optional strobe functions; a Light Emitting Diode (LED) high illumination light bar 41 (approximately 18 to 36 bulbs); a high illumination reflective safety tape 45; Light emitting Diodes (LEDs) signage 89 with text alerts 90 [optional high illumination amber colors or others such as green, bright yellow, orange, various blues . . . all with optional conventional flashing and/or strobe alternatives]; and text alerts 90.

Figure 3:
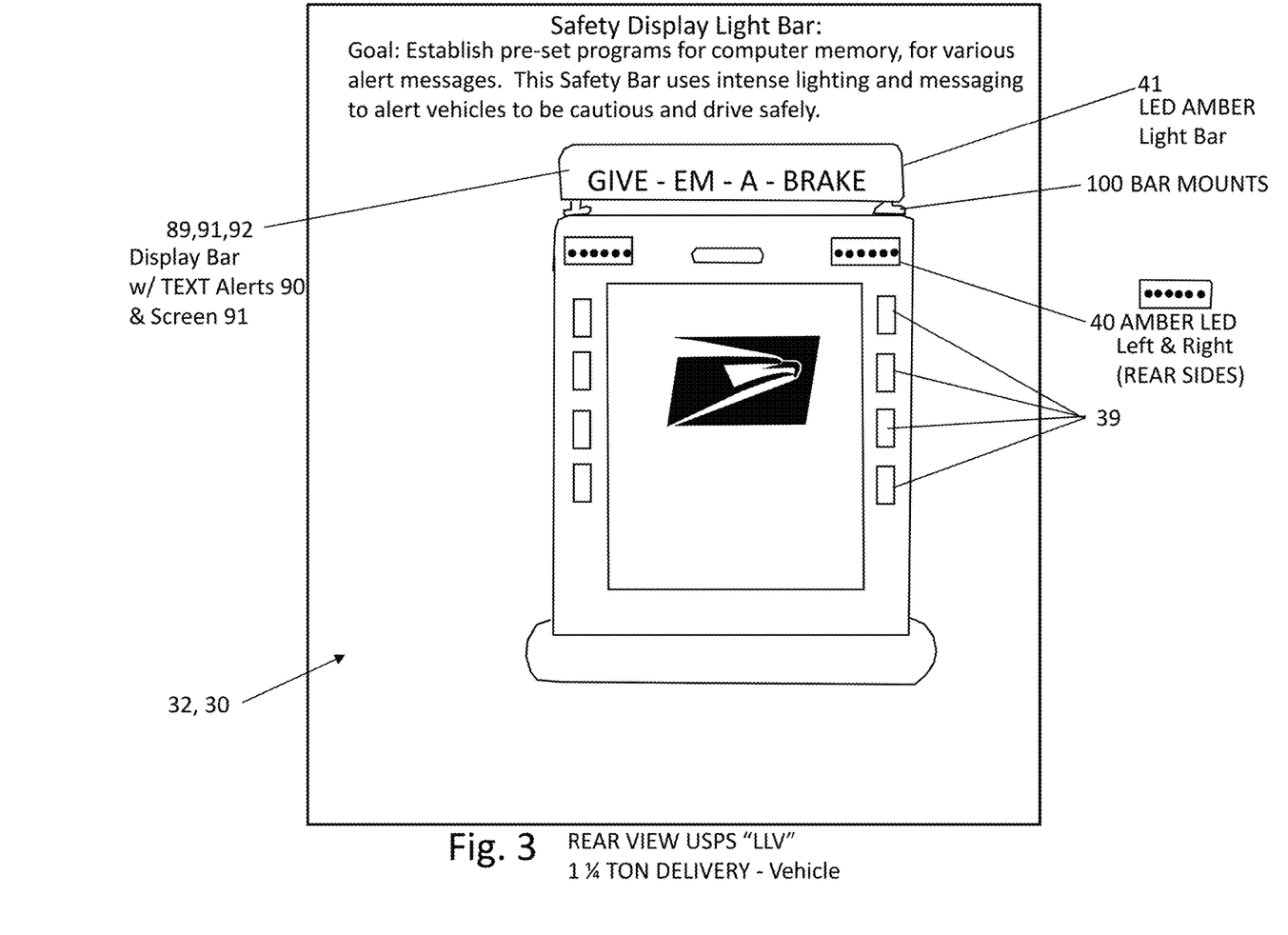
FIG. 3 is a sketch of the original safety alert system concept.
Figure 4:
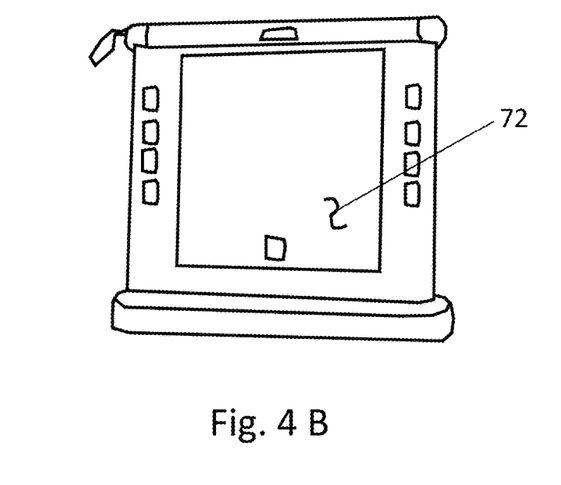
FIGS. 4A through 4D are of a typical rear view of a postal van.
Figure 5:
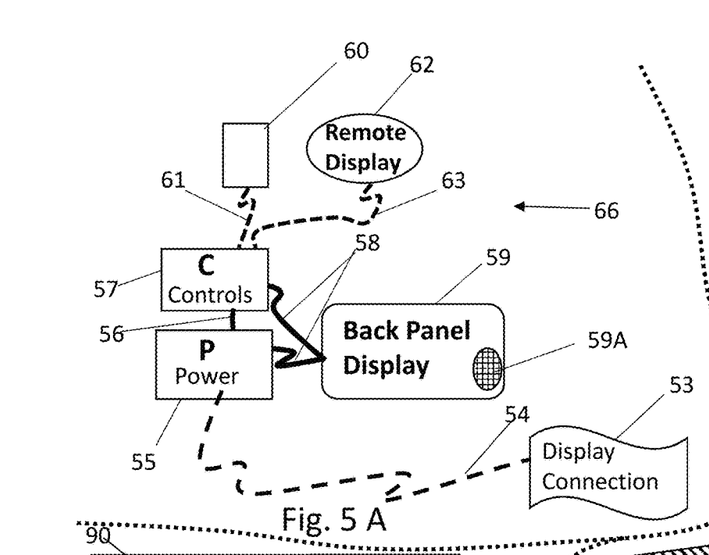
FIGS. 5A through 5E are sketches of the control for the display types, display mounts and typical messages for the safety alert system.
Figure 6A:
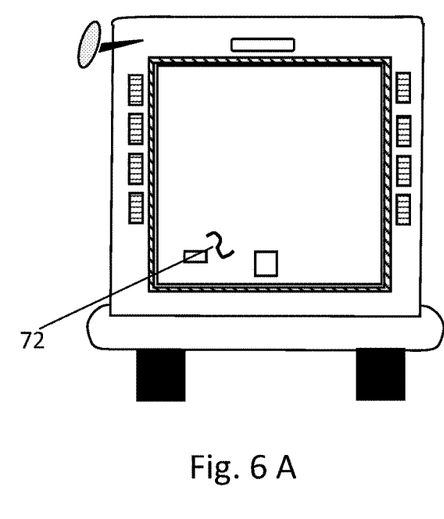
FIGS. 6A through 6G are sketches of various types of delivery vans and trucks that are potential users of the safety alert system.
Figure 6B:
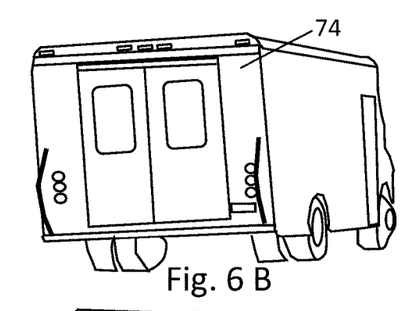
Figure 6C:
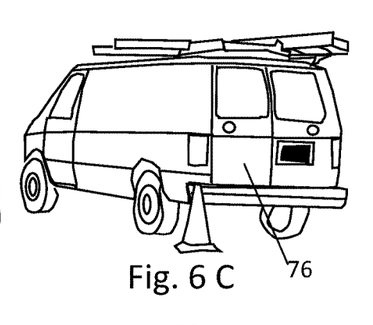
Figure 6D:
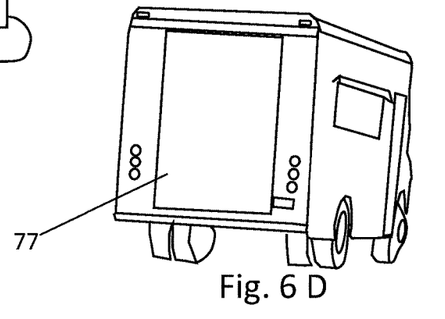
Figure 6E:
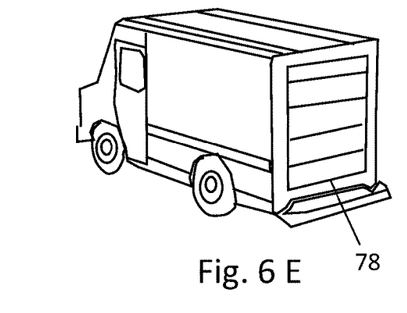
Figure 6F:
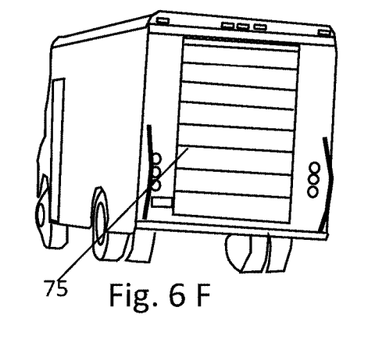
Figure 6G:
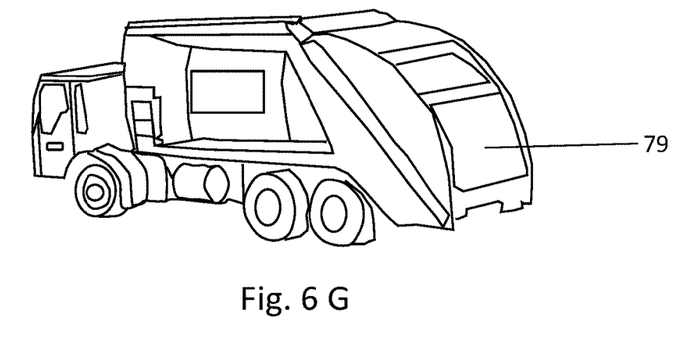
Figure 7A:
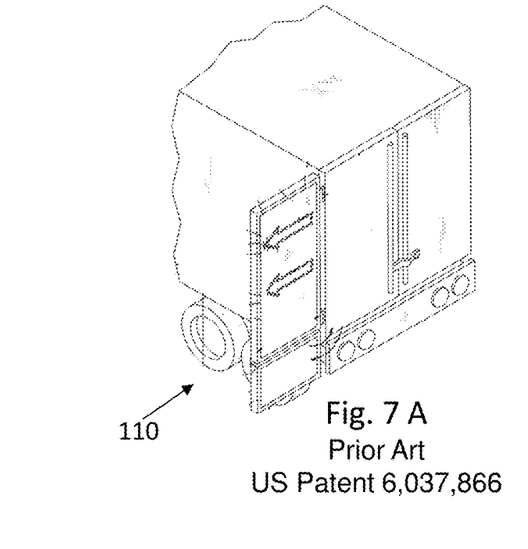
FIGS. 7A through 7E are sketches of prior art for safety alert systems.
Figure 7B:
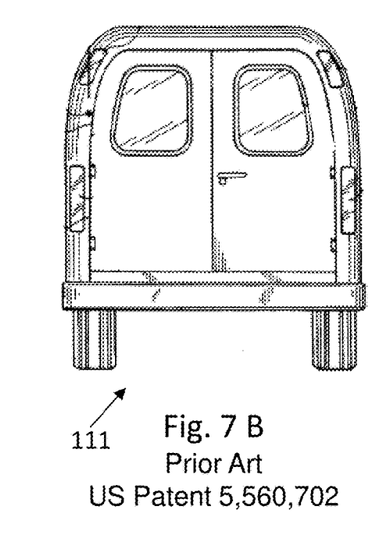
Figure 7C:
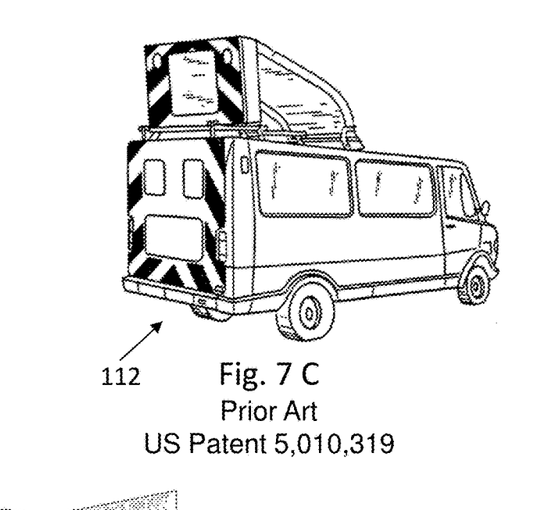
Figure 7D:
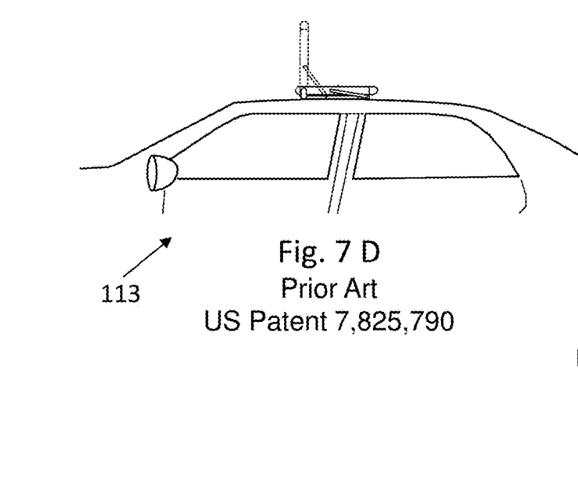
Figure 7E:
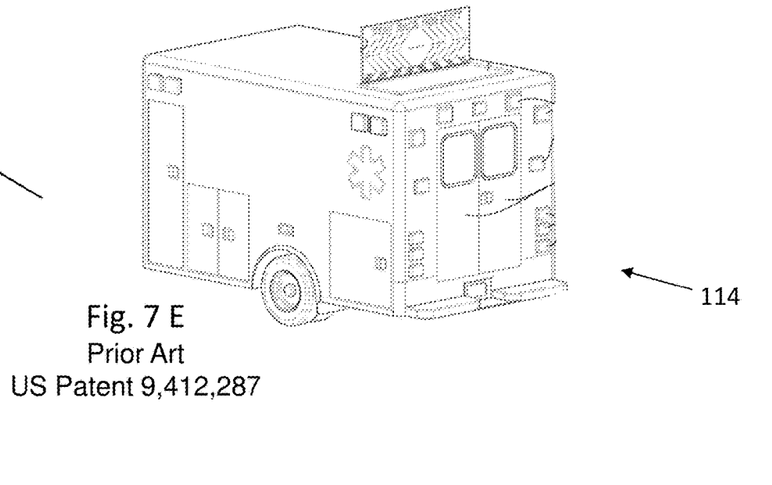

FIG. 3 is a sketch of the original safety alert system concept. This demonstrates the Safety alert system 30 for postal and delivery vans and trucks; an Original concept sketch 32 of the safety alert system 30; an existing 39 alert lighting; a Light Emitting Diode (LED) high illumination light blocks 40 with optional strobe functions; a Light Emitting Diode (LED) high illumination light bar 41 (approximately 18 to 36 bulbs); display 89, 91, 92 (Video and Audio); and a fixed bar mounts 100 for display 89, 91, 92 and for light bars 41.

FIGS. 4A through 4D are of a typical rear views of a postal van 70. Here are shown the simple and typical LLV US Postal Van 70 and a delivery van 72.

FIGS. 5A through 5E are sketches of the control for the display types, display mounts, and typical messages for the safety alert system. One appreciates that the displays Control Box can be integrated with USPS or UPS or Fed-Ex, GPS systems or "IMS" Intelligent Messaging System. The control box can be paired to hand held scanners in the manner cell phone are paired to personal vehicles. Also, the control box functions include multiple flash patterns, push button control for selectable light displays, Located and wired in the vehicle driver cabin. The safety Display Light Bar Assembly, is anticipated to be made of durable aluminum or a rust proof case, a durable plastic face cover (clear visibility), and be light weight with "maintenance free" design features.

FIGS. 5A and 5B show the control systems as a simple and more complex block diagrams. Here the components and features shown include: an electrical connection 53 for van, truck, vehicle, or the like; a wiring/circuit/Bluetooth signal connection 54 to van, truck or vehicle; a means 54A to interconnect the power 55 and a means 56 to control the display 59; a means 56A to Control the Power Source—wiring and connections; a power source 55—connection to the van, truck, vehicle, etc.; a power receptacle 53, a vehicle battery, an auxiliary or supplemental battery, a vehicle or supplemental generator/alternator or a power cord and transformer to an alternating current source (residential or commercial); a means 56A to Control the Power Source—wiring and connections; the main controls 57 (CPU, Circuitry with Inputs—with a keyboard, phone and apps, etc.); a means and connections 58—controls (hard wired or wireless) and power (wiring} to display; display 59, 89, 91, 92 (Video and Audio); an audio systems 59A and amplifiers; a remote Controller 60 including phone apps, near field cable systems, and wired systems; a remote 60 to Main Controller 57 Connection (infrared, wireless, hard wired); a remote Display (In-Cab part of the van, phone, etc.); a connection on remote display 62 to a main controller 57; a means 64 to interconnect the power 55 and a means 56 to control the display 59, 89, 91, 92; a means 56 A to Control the Power Source—wiring and connections; a full control and power system 66 block diagram to multi-purpose cab system; a simplified control and power system 68 block diagram to multi-purpose cab/van system for a typical LLV US Postal Van 70 or a delivery van 72.

FIGS. 5C and 5D show the display systems and mounting systems. Here are portrayed: simple and typical signage 80; Light emitting Diodes (LEDs) signage 89 with text alerts 90 [optional high illumination amber colors or others such as green, bright yellow, orange, various blues . . . all with optional conventional flashing and/or strobe alternatives]; text alerts 90; a computer screen/TV display 91; a split screen display 92; video alerts/visual displays 93; a fixed bar mounts 100 for display 89, 91, 92 for light bars 41; a flip up, manual display fixture 105; a flip up, motorized display fixture 107; and a motor and structure 109 for motorized display 107. Other options for mounting include: hydraulic cylinder arm-Mounts to allow the bar to erect and detract the unit; motorized/mechanical arm-mounts to allow the bar to erect and detract the unit; basic bar mounts to allow the bar to he stationary and. secured. to vehicle; and. magnetic base option to easily attach to roof and detach from vehicle.

FIG. 5E shows a set of examples for the text messages 90. As examples and not for limitation, one sees Features/Options for a Light Emitting Diode Safety Display Light Bar. This could he used for a traffic Adviser or simply as a set of Alert Messages. These are Programmable Memory Messages such as:

A. Slow Down
B. Use Caution.
C. Increase Following Distance
D. Give-FM-A-BRAKE
E. Drive Safely
F. Dangerous Curve Ahead
G. School Zone
H. Rail road crossing
I. Drive to save lives
J. Drive to stay alive K. Drive Defensively
L. Slippery Road Conditions
M. Construction Ahead
N. Hazardous Weather Conditions
O. Caution Children Playing
P. Caution Pedestrians FIGS. 6A through 6G are sketches of various types of delivery vans and trucks that are potential users of the safety alert system. These views show a few examples including: a typical LLV US Postal Van 70; a delivery van 72; a UPS delivery van 74; a Fed Ex Delivery Van 75; a cable van 76; an ice cream/food vendor van 77; a typical service van 78; and a sanitation/refuse/garbage truck 79.

FIGS. 7A through 7E are sketches of prior art for safety alert systems. Here former patents and applications for various safety systems and devices for vehicles are shown. These include: Prior art 110 U.S. Pat. No. 6,037,866; Prior art 111 U.S. Pat. No. 5,560,702; Prior art 112 U.S. Pat. No. 5,010,319; Prior art 113 U.S. Pat. No. 7,825,790; and Prior art 114 U.S. Pat. No. 9,412,287. As can be seen, the Safety alert system 30 for postal and delivery vans and trucks is a unique combination and use as described herein.

The details and features mentioned here are exemplary and not limiting. Other specific components and manners specific to describing a Safety alert system for postal vans and delivery vehicles as a system 30 may be added as a person having ordinary skill in the field of the vehicle safety systems, devices and their uses well appreciates.

OPERATION OF THE PREFERRED EMBODIMENT

The Safety alert system 30 for postal and delivery vans and trucks has been described in the above embodiment. The manner of how the device operates is described below. One notes well that the description above and the operation described here must be taken together to fully illustrate the concept of the Safety alert system 30. The preferred embodiment of the Safety alert system 30 for postal and delivery vans and trucks is comprised of: (a) a pair of Light Emitting Diode (LED) high illumination light blocks 40 with optional strobe functions; (b) an elongated Light Emitting Diode (LED) high illumination light bar 41 (approximately 18 to 36 bulbs); (c) a high illumination reflective safety tape 45; and (d) display module having a display 59, 89, 91,92 (Video and Audio); an audio systems 59A and amplifiers; a remote Controller 60 including phone apps, near field cable systems, and wired systems; a remote (In-Cab of the van, phone, etc.); an electrical connection 53 for van, truck, vehicle, or the like such as a wiring/circuit/Bluetooth signal connection 54, a means 54A to interconnect the power source 55 and a means 56 to control the display 59, 89, 91, 92; a means 56 A to Control the Power Source—wiring and connections; a set of main controls 57 (CPU, Circuitry with Inputs—with a keyboard, phone and apps, etc.); a means and connections 58—controls (hard wired or wireless) and power (wiring} to the display wherein the system has Light emitting Diodes (LEDs) signage 89 with text alerts 90 [optional high illumination amber colors or others such as green, bright yellow, orange, various blues . . . all with optional conventional flashing and/or strobe alternatives] or alternatively a computer screen/TV display 91 or a split screen display 92 with video alerts/visual displays 93 and a means to connect the display 89, 91, 92 to the vehicle such as a fixed bar mounts 100, a manual flip up, or a motorized flip up all incorporated with existing 39 alert lighting and stop lights 38.

The Safety alert system 30 operates somewhat similar to a conventional messaging and communication systems to the other vehicles in the vicinity of the van. Messages for communicating hazards and road conditions are available to the postal drivers and other delivery vehicles. The driver selects a message. Next, from a phone app (application) or hardwired control the driver activates the text or visual panel that is rear facing to traffic and other drivers near or behind the van. Further, with the Safety alert system for postal and delivery vans and trucks, there are multiple high luminosity light bars and LED clusters which the van driver can control to create a visual outburst. This alerts drivers in vehicles behind or near the van that a driver is actually in the van and is actively delivering and picking up packages. Thereby, the presence of the van driver is selectively highlighted and that knowledge of the driver's presence further enhances communication to the other nearby vehicles. This alert or enhanced communication improves the likelihood that the driver will be safer since others are aware of his/her presence in the immediate area of the van.

Many other vehicle delivery systems beyond a postal van are anticipated to use essentially the same system as the Safety alert system 30 for postal and delivery vans and trucks. Some examples, and not limitations, are shown in the following Table.

| Item | Description |
| --- | --- |
| 1 | Typical LLV US Postal Van 70 |
| 2 | Delivery van 72 |
| 3 | UPS delivery van 74 |
| 4 | Fed Ex Delivery Van 75 |
| 5 | Cable van 76 |
| 6 | Ice cream/food vendor van 77 |
| 7 | Typical service van 78 |
| 8 | Sanitation/refuse/garbage truck 79 |

With this description it is to be understood that the Safety alert system 30 for postal and delivery vans and trucks is not to be limited to only the disclosed embodiment of product. The features of the Safety alert system 30 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

The present invention contemplates modifications as would occur to those skilled in the art. While the disclosure has been illustrated and described in detail in the figures and the foregoing description, the same is to be considered as illustrative and not restrictive in character, it being understood that only selected embodiments have been shown and described. and that all changes, modifications and. equivalents that come within the spirit of the disclosures described heretofore and or/defined by the following claims are desired to be protected.

What is claimed is:

1. A Safety alert system (30) for postal and delivery vans and trucks for regulating traffic with electrically controlled luminous elements is comprised of:
   (a) a pair of Light Emitting Diode (LED) high illumination light blocks (40) with a strobe functions;
   (b) an elongated Light Emitting Diode (LED) high illumination light bar (41);
   (c) a high illumination reflective safety tape (45); and
   (d) a display module which is comprised of a video display (59), (89), (91), (92), an audio system (59A) with speakers, and amplifiers, wherein the system has Light emitting Diodes (LEDs) signage (89) with text alerts (90), high illumination colors and conventional flashing and strobe lighting; a computer screen and display (91), and a means to connect the display (89), (91), (92) to a vehicle with fixed bar mounts (100), a manual flip up, and a motorized flip-up.

2. The Safety alert system (30) in claim 1 wherein the illumination light bar (41) is further comprised with a minimum 18 bulbs and a maximum 36 bulbs.

3. The Safety alert system (30) in claim 1 further comprised of a remote Controller (60); a remote (62) for the display; a set of electrical connections (53) for a van, truck, and vehicle; a set of main controls (57); a means for electrical connections (58); and a power source connection to the display.

4. The Safety alert system (30) in claim 3 wherein the remote Controller (60) is selected from the group consisting of phone applications (apps), near field cable connections, and wired systems.

5. The Safety alert system (30) in claim 3 wherein the remote (62) for the display is selected from the group consisting of in-Cab controls and phone apps.

6. The Safety alert system (30) in claim 3 wherein the set of electrical connections (53) for van, truck, and vehicle is further comprised of fixed wiring, circuit boards and bluetooth signal connection (54), a means (54A) to interconnect the power source(55), and a means to control (56) the display (59), (89), 91), (92).

7. The Safety alert system (30) in claim 4 wherein the set of main controls (57) is a computer processing unit selected from the group consisting of a keyboard, phone and phone apps.

8. A Safety alert system for postal and delivery vans and trucks for regulating traffic with electrically controlled luminous elements trucks is comprised of:
   (a) a pair of Light Emitting Diode (LED) high illumination light blocks (40) with a strobe function;
   (b) an elongated Light Emitting Diode (LED) high illumination light bar (41) consisting of at least 18 bulbs);
   (c) a high illumination reflective safety tape (45); and
   (d) a display module having a video display (59), (89), (91), (92), an audio system (59A) and amplifiers; a remote Controller (60); a remote; an electrical connection (53) for van, truck, and vehicle; a set of main controls (57); a means and connections (58); and a power source connected to the display wherein the system has Light emitting Diodes (LEDs) signage (89) with text alerts (90), high illumination colors and conventional flashing and/ or strobe lighting; a computer screen and display (91), and a means to connect the display (89), (91), (92) to a vehicle with fixed bar mounts (100), a manual flip up, and a motorized flip-up.

9. The Safety alert system (30) in claim 8 further comprised of a remote Controller (60); a remote (62) for the display; a set of electrical connections (53) for a van, truck, and vehicle; a set of main controls (57); a means for making electrical connections (58); and a power source connection to the display.

10. The Safety alert system (30) in claim 8 wherein the remote Controller (60) is selected from the group consisting of phone apps, near field cable connections, and wired systems.

11. The Safety alert system (30) in claim 8 wherein the remote (62) for the display is selected from the group consisting of in-Cab controls and phone apps.

12. The Safety alert system (30) in claim 8 wherein the set of electrical connections (53) for van, truck, and vehicle is further comprised of fixed wiring, circuit boards and bluetooth signal connection (54), a means (54A) to interconnect the power source (55), and a means to control (56) the display (59), (89), 91), (92).

13. The Safety alert system (30) in claim 8 wherein the set of main controls (57) is a computer processing unit selected from the group consisting of a keyboard, phone and phone apps.

\* \* \* \* \*